United States Patent [19]
Wissel et al.

[11] 4,267,591
[45] May 12, 1981

[54] QPSK SUPPRESSED CARRIER WITH ROTATING REFERENCE PHASE

[75] Inventors: F. A. Wissel; D. A. Kiliman, both of Cincinnati, Ohio

[73] Assignee: Cincinnati Electronics Corporation, Cincinnati, Ohio

[21] Appl. No.: 30,905

[22] Filed: Apr. 17, 1979

[51] Int. Cl.³ .............................................. H04J 11/00
[52] U.S. Cl. ...................................... 370/11; 370/12; 370/20; 375/54; 375/55; 375/110; 375/38
[58] Field of Search ................... 325/30, 39, 40, 59, 325/60, 320; 179/15 A, 15 BM, 15 BC; 178/66 R, 67, 68; 370/12, 19, 11, 20; 375/52, 53, 54, 55, 110, 38, 39

[56] References Cited

U.S. PATENT DOCUMENTS

| | | | |
|---|---|---|---|
| 3,289,082 | 11/1966 | Shumate | 325/60 |
| 3,343,093 | 9/1967 | Van Gerwen | 325/60 |
| 3,423,529 | 1/1969 | O'Neill, Jr. | 325/60 |
| 3,443,229 | 5/1969 | Becker | 179/15 BC |
| 3,701,948 | 10/1972 | McAuliffe | 325/60 |
| 3,818,346 | 6/1974 | Fletcher et al. | 325/320 |
| 3,909,750 | 9/1975 | Brady | 332/9 R |
| 3,924,186 | 12/1975 | Gordy et al. | 325/30 |

*Primary Examiner*—Benedict V. Safourek
*Attorney, Agent, or Firm*—Lowe, King, Price & Becker

[57] ABSTRACT

A suppressed carrier signal is offset quadrature phase shift key modulated so the reference carrier phase is stepped 90° in the same direction in synchronism with sequential bits of a serial data stream and is further bi-phase modulated in response to the binary data source having first or second binary values. A coherent receiver responds to the suppressed carrier signal to establish an equivalent sequence of stepping reference phases at the carrier frequency. The reference phases synchronously rotate in 90° increments in the same direction as the suppressed carrier reference, being permitted a four-fold initial phase ambiguity (0°, 90°, 180°, and 270°). The rotating reference phase is compared in a bi-phase manner with the appropriate component of the suppressed carrier signal to derive sequential d.c. polarities indicative of the binary bit values during the sequential binary data bits.

40 Claims, 3 Drawing Figures

QPSK SUPPRESSED CARRIER WITH ROTATING REFERENCE PHASE

TECHNICAL FIELD

The present invention relates generally to offset quadrature phase shift key suppressed carrier systems transmitting a single data stream and more particularly to a quadrature phase shift key suppressed carrier system wherein a reference phase is continually shifted in a given direction.

BACKGROUND ART

In offset quadrature phase shift key suppressed carrier modulation systems (OQPSK) there are four nominal phase possibilities, depending upon the nature of a transmitted binary coded message. If there is no original transmitted reference or a signal dropout at a receiver, a four-fold ambiguity can exist. One conventional method of handling the absence of an original transmitted reference or a signal dropout involves differential coding in each of two quadrature channels that carry in phase and quadrature (I and Q) symbols representing a pair of sequential binary data bits. The differential coding introduces degradation since a single channel error results in a pair of sequential errors in the respective quadrature channels.

It is, accordingly, an object of the present invention to provide a new and improved method of and apparatus for transmitting and coherently receiving an offset quadrature phase shift key signal wherein an error in one channel does not have an adverse effect on two recovered bits of a combined serial data stream.

Another object of the invention is to provide a new and improved system for and method of transmitting and receiving a single channel of binary data modulated on an offset quadrature phase shift key suppressed carrier wherein the phase of the received signal components independently represents a consistent stream of binary values of the data source.

DISCLOSURE OF THE INVENTION

The present invention is based on the realization that some messages, such as analog voice and other coded transmission signals, such as address signals, can tolerate a long term polarity ambiguity without performance losses. The invention utilizes this tolerance to provide a relatively simple coding scheme which avoids the use of differential message decoding. The system and method of the present invention involve establishing a reference phase which always rotates in the same direction at the transmitter and receiver. The rotating reference phase is in contrast to the prior art alternating reference phase (0°, 90°, 0°, 90°, . . .). In the particularly described embodiment, the reference phase rotates in the counterclockwise direction, but it is to be understood that the reference phase can rotate either counterclockwise or clockwise. In the particularly described embodiment, the reference phase steps in sequence 0°, 90°, 180°, 270°, and 0° in the counterclockwise direction for transmitting and receiving sequential first, second, third, fourth, and fifth binary bits of a single channel binary data source, such as a coded analog voice signal or binary address signals.

As used herein a transmitted reference phase is the phase of the respective I or Q channel component that would be transmitted from an associated binary one data symbol, referred to the nominal I channel base (0°). Thus I, Q, $\bar{I}$, $\bar{Q}$ are considered to be 0°, 90°, 180°, and 270°, respectively. Similarly the receiver reference phase is the phase of a received symbol in the associated I or Q channel that will produce a binary one symbol output, referred to the receiver I channel base (0°).

Because of the counterclockwise phase rotation, a positive phasor reference is always 90° counterclockwise from the preceding positive phasor reference. Therefore, in the present system, there are actually no fixed in phase (I) and quadrature (Q) phasor references. Instead, the phasor references continuously rotate at the receiver. The rotating phasor references are related in a fixed pattern to a reference phase of a carrier derived from a carrier tracking phase locked loop of the receiver. The carrier tracking loop may lock up in one of four possible reference phases, rather than in any particular one of the four phases.

The reference for the bi-phase data modulation continually shifts in 90° increments in synchronism with the data inputs. Now the reference phase coincides with the (then) associated I or Q channel output phase for a binary data bit. Thus at the transmitter a message 11111 could be sent with sequential phases (dependent upon message reference timing) as 0°, 90°, 180°, 270°, 0°; 90°, 180°, 270°, 0°, 90°; 180°, 270°, 0°, 90°, 180°; or 270°, 0°, 90°, 180°, 270°. If, instead, any or all of the five data bits were binary zeros, then the respective, mentioned phases would be changed by 180°. Because the I and Q channels are staggered and therefore have an overlapping character, the composite phase output would necessarily agree with the above-stated figures only in the center of a bit interval.

The receiver, with the same four-fold ambiguity, could also receive any one of the four possible phase groups for the transmitted message independent of which one was sent. However, because of the matched rotational consistency of the transmitter and receiver channels either the message or its complement will be consistently decoded.

Generalizing, the invention involves transmitting a single channel of binary coded data synchronized to a clock source having a predetermined frequency. The data are capable of tolerating long term polarity ambiguity without performance loss, such as coded voice and address signals. A carrier is effectively phase modulated at the rate of the clock frequency by a simple technique so that the reference phase is sequentially phase stepped in the same direction ±90K° in response to first, second, third . . . K sequential bits of the binary data respectively. For selected counterclockwise phase rotation the plus sign is used while for clockwise rotation the minus sign is used. The sequential rotations occur in synchronism with the bit rate clock.

At the receiver, the suppressed carrier signal establishes a sequence of equivalent stepping reference phases at the carrier frequency. The reference phases rotate in 90° increments at the same rate in the same direction as the suppressed carrier reference from the transmitter. The rotating reference phase is compared with the received signal to derive sequential first second, third, . . . Kth d.c. bilevel signals having polarities indicative of the binary bit values during the first, second, third . . . Kth binary bits. The comparison is performed in first and second orthogonal channels respectively responsive to first and second mutually orthogonal replicas of the reference phase derived by the tracking loop. Since, in actuality, the I and Q channel symbol outputs are staggered and usually overlap each other, the I symbol must be sampled for an interval up to two incoming data bits. During sampling intervals for the I symbol, the orthogonal Q channel is receiving the last half of one symbol and the first half of a subsequent symbol. The equivalent process applies in the next bit interval with the I and Q symbols interchanged. The phase locked tracking loop has a voltage controlled oscillator responsive to a properly processed combination of the d.c. levels of the first and second channels to establish a fixed reference phase.

In a particular embodiment there is provided a pair of 90° phase displaced sinusoidal waveforms (and their complements) having a period four times that of a data bit synchronized with the clock source. For the duration of either an I or Q symbol the appropriate channel is modulated with a unipolar half sine wave. If the symbol is a binary one, the wave is normal and if the symbol is binary zero, the wave is inverted. Since both the modulating waveforms and the I and Q phases are orthogonal the total transmitted power does not vary within or between symbols, i.e. there is no amplitude modulation component.

The above and still further objects, features and advantages of the present invention will become apparent upon consideration of the following detailed description of one specific embodiment thereof, especially when taken in conjunction with the accompanying drawing.

BEST MODE FOR CARRYING OUT THE INVENTION

Figure 1:
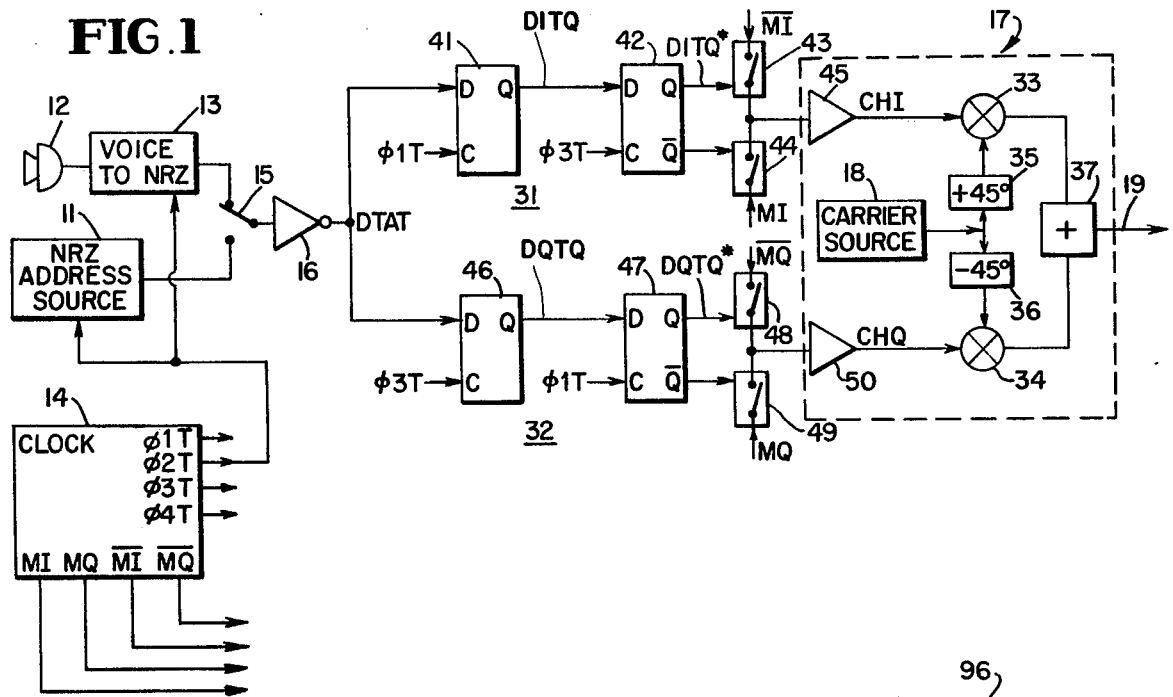
FIG. 1 is a block diagram of a transmitter in accordance with a preferred embodiment of the invention.

Reference is now made to FIG. 1 of the drawings wherein there are illustrated binary, non-return-to-zero (NRZ) address source 11 and an analog voice source, in the form of microphone 12, that drives voice to NRZ converter 13.

Figure 3:
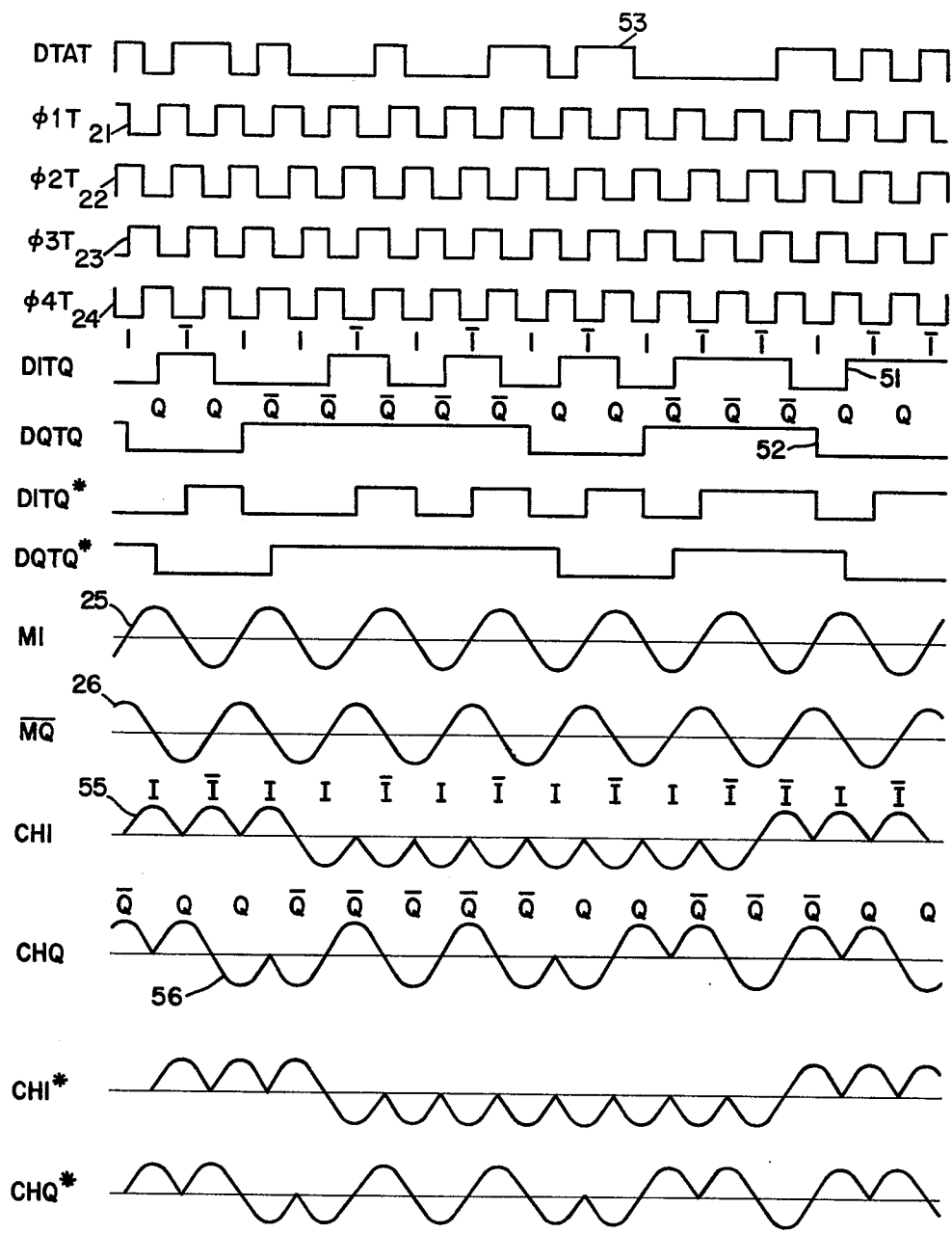
FIG. 3 are waveforms derived in the transmitter and receiver of the preferred embodiments.

Clock source 14 includes a four phase oscillator which derives mutually bi-orthogonal square waves $\phi1T$, $\phi2T$, $\phi3T$, $\phi4T$, waveforms 21–24, FIG. 3. The $\phi2T$ output of clock source 14 is applied to source 11 and converter 13 whereby binary NRZ levels are derived from the source and converter at a regulated frequency and phase determined by the $\phi2T$ output of clock source 14. Clock source 14 includes a regulated four phase, mutually bi-orthogonal source of sinusoidal clock waves MI, MQ, $\overline{MI}$, $\overline{MQ}$; waveforms MI and MQ are illustrated in FIG. 3 as waveforms 25 and 26, which are complementary to waveforms $\overline{MI}$ and $\overline{MQ}$. The sinusoidal clock waves have a frequency one-half the frequency of the square clock waves. The phases of the four sinusoidal clock waves are synchronized with those of the square clock waves such that each zero crossing of MI and $\overline{MI}$ occurs at the same time as the leading edge of each square wave clock $\phi3T$; each zero crossing of MQ and $\overline{MQ}$ occurs at the same time as the leading edges of each square wave clock $\phi1T$.

The output signal of source 11 or converter 13 is selectively applied via switch 15 and inverting driver 16 as NRZ data signal DTAT to a modulator 17 in accordance with the invention. (An exemplary data signal DTAT is illustrated in FIG. 3.) Modulator 17 mixes I and Q channel symbols with properly phase-shifted waves from carrier source 18, to enable an offset suppressed carrier quadrature phase shift key signal to be derived on output lead 19.

To achieve these results, the output of inverter 16 is applied to a pair of parallel orthogonal processing channels 31 and 32 which respectively derive I and Q channel symbols. Channels 31 and 32 control the gating of sinusoidal waves MI, $\overline{MI}$ and MQ, $\overline{MQ}$ to balanced mixers 33 and 34 that are respectively responsive to mutually orthogonal components of carrier source 18, as respectively derived from +45° and −45° phase shifters 35 and 36. The output signals of mixers 33 and 34 are linearly combined in summing network 37 to derive the suppressed carrier, offset quadrature phase shift key output signal on lead 19.

Channel 31 includes a pair of cascaded delay (D) flip-flops 41 and 42 having clock input terminals (C) respectively responsive to clock square waves $\phi1T$ and $\phi3T$. D input terminals of flip-flops 41 and 42 are respectively responsive to NRZ data signal (DTAT) of driver 16 and the Q output of flip-flop 41. Q and $\overline{Q}$ outputs of flip-flop 42 respectively control the opening and closing of switches 43 and 44 in a complementary, mutually exclusive manner. Switches 43 and 44 selectively couple $\overline{MI}$ and MI sinusoidal waveforms to the input of driver 45 which supplies an input signal to mixer 33.

Flip-flop 41 samples alternate bits of DTAT to derive a rectangular wave signal DITQ having edges in synchronism with the leading edges of square wave clock $\phi1T$. (For the exemplary data signal DTAT, signal DITQ has waveform 51, FIG. 3.) Because source 11 and converter 13 are synchronized by clock square wave $\phi2T$ and flip-flop 31 is clocked by square wave $\phi1T$, the input to the D terminal of flip-flop 41 is always in a quiesicent condition at the time a leading edge of $\phi1T$ occurs. The signal at the Q output terminal of flip-flop 41 has a binary one level as represented by a ($\overline{I}$) channel signal if DTAT equals zero at the time a leading edge of $\phi1T$ occurs; conversely, if DTAT equals one while a leading of $\phi1T$ occurs, the DITQ output signal of flip-flop 41 has a binary zero level as represented by an (I) channel symbol. The output signal of flip-flop 42 is further delayed by the interval of one-half the clock period of source 14; thereby, the Q and $\overline{Q}$ outputs of clock source 42 have transitions in synchronism with the leading edges of half sine waves MI and $\overline{MI}$. In response to an I channel symbol the $\overline{Q}$ output of flip-flop 42 provides a binary one level and sinusoid MI is gated through switch 44 to amplifier 45 for one half cycle of the sinusoid. Similarly, in response to an $\overline{I}$ channel symbol there is a binary one at the Q output of flip-flop 42, and the $\overline{MI}$ signal is fed through switch 43 for one-half a cycle of the $\overline{MI}$ wave. The timing between the Q and $\overline{Q}$ outputs of flip-flop 42 and waves MI and $\overline{MI}$ is such that transitions in the state of switches 43 and 44 occur only when zero crossings of the sinusoids occur.

Channel 32 is similar to channel 31. In particular, channel 32 includes cascaded delay flip-flops 46 and 47 having clock (C) inputs respectively responsive to clock square waves $\phi3T$ and $\phi1T$, and D inputs respectively responsive to signal DTAT and the Q output of flip-flop 46. The Q and $\overline{Q}$ outputs of flip-flop 47 respectively control the opening and closing of switches 48 and 49, respectively responsive to the $\overline{MQ}$ and MQ sinusoidal waveforms. Switches 48 and 49 are closed at mutually exclusive times in response to the Q and $\overline{Q}$ output signals of flip-flop 47 having binary one values. The MQ and $\overline{MQ}$ signals selectively coupled through switches 48 and 49 are applied by driver 50 to one input of mixer 34.

Flip-flop 46 responds to signal DTAT and clock source $\phi$3T to derive output signal DQTQ at terminal Q. (DQTQ for the exemplary data signal DTAT is illustrated by waveform 52, FIG. 3.) Signal DQTQ has transitions in synchronism with the leading edges of $\phi$3T. If the data signal DTAT has a binary zero value at the time of a $\phi$3T leading edge, signal DQTQ has a binary one level (represented by channel symbol Q); if, however, DTAT has a binary one level while a $\phi$3T leading edge occurs, DQTQ has a binary one level (indicated by channel symbol Q). The DQTQ output signal of flip-flop 46 is delayed by the period of one of the square waves of clock source 14, whereby the flip-flop derives a $\overline{Q}$ output signal having the same shape as signal DQTQ, but with transitions occurring simultaneously with the leading edges of square wave clock $\phi$1T. The other, Q, output of flip-flop 47 has an identical, complementary waveform as the $\overline{Q}$ output of the flip-flop. The Q and $\overline{Q}$ outputs of flip-flop 47 are timed so that the transitions thereof occur at the same time as zero crossings of the MQ and $\overline{MQ}$ sinusoidal waveforms.

For the exemplary DTAT data waveform 53, output signals CHI and CHQ of amplifiers 45 and 50 are respectively indicated by waveforms 55 and 56, FIG. 3. Each of waveforms 55 and 56 is a series of bi-orthogonal half wave sinusoids with the same duration as two adjacent bits of data source DTAT. Zero crossings of waveform 55 and 56 occur at phases that are displaced from each other by 90°. The zero crossings of waveforms 55 and 56, however, occur in synchronism with the delayed replicas of the I and Q channel symbols, as represented by delayed replicas of signals DITQ and DQTQ; the delay equals the period of one pulse of clock source 14.

It will be observed that the waveforms MI and MQ and their complements are full sine waves (alternating in polarity every half cycle). This produces in each of the I and Q channels an alternately direct and complementary relationship between input data and modulating polarity. Thus if the data were a succession of binary ones, an output of IQ, $\overline{IQ}$, IQ, $\overline{IQ}$, . . . would be produced instead of the prior art IQ, IQ, IQ, IQ, . . . . This is equivalent to alternately reversing the response polarity-wise of each component channel and produces the same effect on the transmitted signal as if the reference carrier were rotated 90° per bit interval instead of alternately shifting plus and minus 90°. (It will be recalled that in the IQ coordinate system IQ$\overline{IQ}$ is equivalent to the counterclockwise rotation.)

This method reduces a four-fold ambiguity to a two-fold level. Since a carrier tracking loop at the receiver can lock to any one of four phases, it is not known whether a particular sample is an I or a Q (or $\overline{I}$ or $\overline{Q}$). Therefore in the prior art approach it cannot be determined whether the reference shift direction for the next bit is clockwise or counterclockwise. In the present invention the reference always shifts in a given direction (e.g. counterclockwise) and it does not matter whether a given symbol is received in the I or Q channel. (Of course the general polarity of *both* signals together is uncertain but that is less important and may be of no concern.) It should be recognized that the prior art approach cannot operate without some form of differential coding since two of the four possible receiver phase lock conditions involve one inverted and one non-inverted channel relationship. Thus in the prior art a 1111 transmission could be received as 1010 or 0101, as opposed to a 1111 or 0000; the reception of 0000 for 1111 is often acceptable but reception of 1010 or 0101 for 1111 is always unacceptable.

The product signals derived by mixers 33 and 34 are linearly combined, by being added together, in summing circuit 37. Since the modulation envelopes of the two staggered data channels overlap, the result is an addition of two variable amplitude quadrature phase carrier signals. In general the output of circuit 37 is a carrier signal varying i both phase and amplitude during a data bit interval. The carrier can be described by $f(t) = R/\theta$, where $R = (i^2 + q^2)^{\frac{1}{2}}$, $\tan \theta = q/i$, and i and q are respectively the instantaneous envelope amplitudes in the I and Q channels. However, in the particular described embodiment, the I and Q channel envelopes are half sinusoids displaced either 90° or 270° from each other and the instantaneous envelope power output is proportional to $$I^2 \cos^2 \theta + Q^2 \sin^2 \theta = R^2(\theta) = R^2(\omega_m t)$$

where $\omega_m$ is the modulating envelope frequency. If I and Q are identical in amplitude, R is a constant independent of t since $\cos^2 \theta + \sin^2 \theta = 1$.

There is an unlimited number of envelope waveforms for i and q which also produce constant amplitude throughout the data bit. The particular described embodiment has near-minimum power spectral bandwidth (at the 99% point) and is easily realized. All such approaches have the benefit of providing good spectral control in amplitude-limited RF channels with little or no post-modulation filtering. However, the benefits of the rotational reference coding are not dependent upon the use of a constant-amplitude modulator approach.

Figure 2:
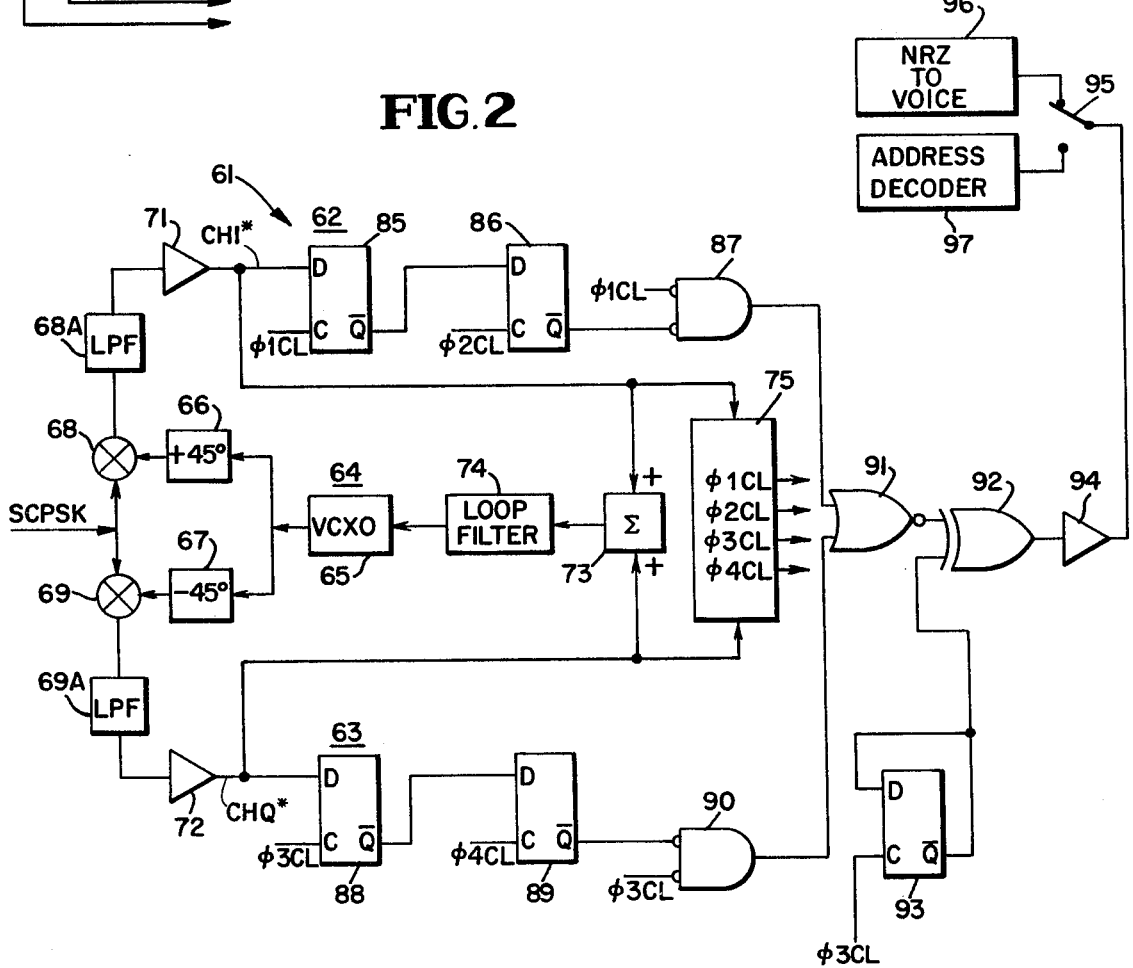
FIG. 2 is a block diagram of a receiver in accordance with a preferred embodiment of the invention.

The offset, suppressed carrier quadrature phase shift key signal derived on lead 19 is supplied via a suitable transmission medium, such as radio, telegraph or telephone link to a receiver 61, as illustrated in FIG. 2. The suppressed carrier offset quadrature phase shift key is applied in parallel to orthogonal coherent detecting channels 62 and 63 which separate the I and Q channel symbols and enable them to be combined into a single data signal that is a replica of the original data signal derived from inverting driver 16 (FIG. 1).

The coherent quadrature demodulation process is performed with the aid of tracking phase locked loop 64, including voltage controlled oscillator 65. Oscillator 65 derives a signal at the carrier frequency of the suppressed carrier offset quadratue phase shift key signal applied to receiver 61. The signal derived from oscillator 65 has a reference phase and is applied in parallel to +45° phase shifter 66 and −45° phase shifter 67. Mutually orthogonal output signals of phase shifters 66 and 67 are respectively applied to mixers 68 and 69, both of which are driven in parallel by the received offset quadrature phase shift key suppressed carrier signal.

The orthogonally related beat frequency output signals of mixers 68 and 69 are respectively applied through low pass filters 68a and 69a to driver amplifiers 71 and 72. Amplifiers 71 and 72 derive output signals that are properly combined in summing network 73, to derive an output control signal. (Costas or decision-directed circuitry represent the usual approach to ambiguously recover the suppressed carrier phase.) The output of circuit 73 is applied to loop filter 74 that drives voltage controlled oscillator 65 to establish a reference phase output of the oscillator at the carrier frequency of the suppressed carrier received wave.

The output signals of amplifiers 71 and 72 are also applied to bit synchronizer 75. Bit synchronizer 75 is basically a phase detector that derives a d.c. error signal indicative of the phase difference between the zero crossings of amplifiers 71 and 72 output signals and the reference clock. Bit synchronizer 75 responds to the detected phase error to control the phase of a four phase square wave having the same regulated frequency as the square waves derived by clock source 14, FIG. 1. The four phases $\phi 1CL$, $\phi 2CL$, $\phi 3CL$, and $\phi 4CL$ derived by bit synchronizer 75 are mutually bi-orthogonal and illustrated by waveforms 21–24, FIG. 3. The phase error signal derived by bit synchronizer 75 controls the phase of the four mutually orthogonal square wave clock waves by supplying count signals to a string of counter stages driven by the clock source. The four phase waves are derived from output terminals of different counter stages.

Basically, each of channels 62 and 63 inverts every other symbol received from each channel in a way consistent with the transmission to provide an effective rotating reference and provide the proper polarity of the channel symbols. Assuming the transmitter polarity inverts after each Q symbol, the receiver does likewise. For example, the apparent recovered channel symbols $IQ\overline{IQ}$ are converted from 1100 to 1111 as would also be $\overline{QIQI}$; $\overline{IQ}IQ$ or $\overline{QIQI}$ would be recognized as 0000. Thus the four possible received signals (dependent upon the initial carrier loop phase lock condition) are reduced to a two-fold ambiguity. This polarity ambiguity can be tolerated because of the nature of the transmitted signals, as described supra.

For proper demodulation, each of the channels 62 and 63 includes a low pass filter and a pair of cascaded D flip-flops and a NAND gate. The clock pulses applied to the flip-flops and the NAND gate are derived from the bit synchronizer with phases appropriate to optimum representation of the channel data.

The response characteristic or cut off frequency of filter 68a relative to the beat frequency output of mixer 69 is such that the filter reaches a peak amplitude during the duration of one unipolar received symbol. The phase of clock square wave $\phi 1CL$ is such that transitions thereof occur simultaneously with the corresponding peak of the wave derived from amplifier 71. This waveform is shown as CHI*. The phase clock wave $\phi 2CL$ is such as to delay by one quarter cycle (90°) the two bit length (minimum) steps derived from flip-flop 86. This delayed ($\overline{Q}$) output of flip-flop 86 is applied to one input of NAND gate 87, having a second input responsive to square wave clock wave $\phi 1CL$. The zero-level pulses supplied to NAND gate 87 from $\phi 1CL$ thus occur halfway between possible transactions of the derived I channel NRZ wave from flip-flop 86. NAND gate 87 derives a sequence of pulses representing binary zero symbols in the I channel.

Channel 63 is similar to channel 62 and includes cascaded D flip-flops 88 and 89, having D input terminals respectively responsive to the filtered output signals of amplifier 72 and the $\overline{Q}$ output terminal of flip-flop 88. Clock (C) input terminals of flip-flops 88 and 89 are respectively responsive to square wave clock signals $\phi 3CL$ and $\phi 4CL$. Thereby, flip-flop 88 responds to the peak values of channel waveform symbol CHQ* to derive an NRZ wave having possible transitions in synchronism with the peak values of channel symbol CHQ*. The inverted output, at the $\overline{Q}$ terminal of flip-flop 88, is delayed in flip-flop 89 by 90° of the clock frequency derived from bit synchronizer 75. The 90° phase delay is provided by flip-flop 89 being responsive to positive going transitions of the $\phi 2CL$ waveform. The again inverted $\overline{Q}$ output signal of flip-flop 89 is combined in NAND gate 90 with square wave clock wave $\phi 3CL$ to derive a sequence of positive pulses representing binary zero symbols in the channel.

The sequence of recovered I and Q channel symbols derived from NAND gates 87 and 90 is combined in logic circuitry including NOR gate 91, exclusive OR gate 92 and delay flip-flop 93. The gate 91 combines the interleaved output signals of channels 62 and 63 to provide a valid NRZ serial data stream such that a low output level represents a binary zero level in the respective sampled channel. As a result of this combination, binary ones are also properly represented. Exclusive OR gate 92 inverts every other pair of IQ symbols. For example, if the channel symbols derived from channels 62 and 63 are IQIQ, the signals supplied by exclusive OR gate 92 to amplifier 94 are $IQ\overline{IQ}$.

To these ends, D flip-flop 93 is activated by $\phi 3CL$ and a feedback path to supply inverting control input signals to exclusive OR gate 92. Two-to-one division is accomplished by flip-flop delay and the feedback from the $\overline{Q}$ output terminal to input terminal D. The output signals of NOR gate 91 and the $\overline{Q}$ output terminal of flip-flop 93 are combined in exclusive OR gate 92, which feeds amplifier 94.

The resulting output signal of amplifier 94, a replica of data signal DTAT, or the complement thereof, is supplied through switch 95 to one of NRZ to voice converter 96 or address decoder 97. Switch 95 couples the output signal of converter 13 to amplifier 16; conversely, switch 95 couples the output of amplifier 94 to decoder 97 while switch 15 couples the address signal derived from source 11 to the input of amplifier 16.

The demodulator (like the modulator) utilizes a very simple means of implementing equivalent reference rotation with fixed reference RF phase sources. It is, however, vital for consistency to exist between modulator and demodulator. For example, in implementation, the modulator and demodulator Q channels both lead to the respective I channels in phase and the polarity transitions always follow transmission or reception in the Q channel.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of transmitting binary coded serial data bits synchronized to a clock source having a predetermined frequency, said data being capable of tolerating long term polarity ambiguity without performance loss, such as coded voice and address signals, comprising the steps of dividing the data stream into first and second separate time-interleaved components synchronized with the frequency and phase of the clock source so that they are at half the frequency of the clock source and the first and second components themselves are alternately inverted and uninverted in response to respective values of the data, bi-phase modulating orthogonal first and second components of a carrier in response to the modified first and second orthogonal components, and combining the first and second modulated carrier components to derive a suppressed carrier offset quadrature phase shift key signal.

2. The method of claim 1 wherein the components are modulated and combined so the suppressed carrier has a constant envelope amplitude.

3. A method of transmitting binary coded serial data synchronized to a clock source having a predetermined frequency, said data being capable of tolerating long term polarity ambiguity without performance loss, such as coded voice and address signals, comprising phase modulating a suppressed carrier offset quadrature phase shift key signal having a constant amplitude envelope at the rate of the clock frequency so that the reference carrier phase for successive bits is sequentially phase rotated 90° in the same selected direction in synchronism with the clock source, said reference phase being additionally bi-phase modulated in response to sequential bits of the binary data.

4. A method of transmitting a stream of serial binary data bits comprising quaternary phase shift key signal modulating a carrier to derive a suppressed carrier having first and second orthogonal components alternately responsive to sequential binary values of the serial data stream, each component having alternately inverted and non-inverted bi-phase polarity relative to respective values of bits in the data stream.

5. A method of coherently detecting data from a suppressed carrier phase shift key signal modulated so a reference carrier phase for sequential bits of a single channel binary data source is sequentially stepped in 90° increments in the same direction in synchronism with a data bit interval, said reference phase being bi-phase modulated in response to first and second binary values of the data source, comprising responding to the suppressed carrier signal to establish a sequence of stepped reference phases at the carrier frequency, rotating said sequence of stepped reference phases in 90° increments in the same direction as the reference carrier phase in synchronism with the incoming sequential data bit intervals, and phase comparing the rotating reference phase with the phase of the suppressed carrier signal to derive sequential d.c. polarities consistently indicative of either the binary data bit values or complements thereof.

6. A method of detecting single channel serial data from a suppressed carrier offset quadrature phase shift key signal modulated so a reference phase for sequential binary data bits is sequentially stepped 90° in the same direction and has a bi-phase response to sequential binary bits having first or second values, comprising responding to the suppressed carrier signal to establish any one of four possible reference phase states at the carrier frequency, said reference phase stepping 90° in the same direction as and in synchronism with the suppressed carrier signal reference for sequential data bit intervals, and phase comparing the rotating reference phase with the respective component phase of the suppressed carrier to derive sequential d.c. polarities indicative of the binary bit values during the sequential binary bits.

7. The method of claim 6 wherein the phase comparison is performed in first and second orthogonal channels both responsive to the suppressed carrier signal with each channel responsive only to two of four possible states of the received signal phase, whereby first and second d.c. polarities are sequentially derived in the respective channels with the channels respectively responsive to alternate data bits, and combining the derived polarities from the first and second channels along with appropriate polarity inversion to decode the single-channel binary data stream.

8. The method of claim 7 wherein the reference phase for the orthogonal channels is established in a phase locked loop having a voltage controlled oscillator responsive to the proper combination of the d.c. levels of the first and second channels.

9. A method of communicating single channel binary coded data bits synchronized to a clock source having a predetermined frequency, said data being capable of tolerating long term polarity ambiguity without performance loss, such as coded voice and address signals, comprising phase modulating a suppressed carrier constant amplitude envelope at the rate of the clock frequency so that the carrier for sequential data bits is sequentially phase incremented 90° in the same direction $$[I+(\text{sgn}K)](90°)$$

in response to first, second, third . . . (K)th sequential bits of the binary data respectively having first or second binary values, wherein $|K|=K,$
$I=0, 1, 2, 3$ (initial phase condition)

and $$(\text{sgn}K)=\pm 1$$

depending upon rotation direction, each of the sequential increments being for the period of one clock cycle, at a receiver responding to the suppressed carrier signal to establish a sequence of rotating reference phases at the carrier frequency, said reference phases stepping 90° in the same direction as the suppressed carrier $$[P+(\text{sgn}K)](90°)$$

where P is any one of 0, 1, 2 or 3 depending on the initial phase condition of the receiver during the intervals while the first, second, third . . . (K)th bits are modulating the suppressed carrier, and phase comparing the rotating reference phase with the phase of the suppressed carrier to derive sequential first, second, third . . . Kth d.c. levels indicative of the binary bit values during the first, second, third . . . Kth binary bits.

10. Apparatus for transmitting binary coded data capable of tolerating long term polarity ambiguity without performance loss, such as coded voide or address signals, comprising a source of clock signals, means for synchronizing bits of the binary coded data to the clock source, a pair of 90° phase displaced sinusoidal modulating waveforms having a frequency $\omega_m$ equal to one quarter the bit rate of the synchronized data and represented by $\sin \omega_m t$ and $\cos \omega_m t$, a carrier source and first and second orthogonal modulated channels having a frequency $\omega_c$, and means responsive to the clock source and the modulating waveforms for directing alternate data bits to the first and second modulated channels in interleaved fashion so the respective modulating waveforms are inverted or not inverted in response to the associated data bit binary value to produce in an alternating and overlapped manners $\pm[(\cos \omega_{mt})(\cos \omega_{ct}),$ and $\pm(\sin \omega_{mt})(\sin \omega_{ct})](\cos \omega_m t)(\cos \omega_c t),$ and $\pm(\sin \omega_m t)(\sin \omega_c t)$ from respective first and second channels, the response to an associated data bit being limited to and synchronized with half-cycle intervals of unchanging polarity for the functions $[\cos \omega_{mt}$ and $\sin \omega_{mt}] \cos \omega_m t$ and $\sin \omega_m t$.

11. Apparatus for transmitting binary coded serial data, said data being capable of tolerating long term polarity ambiguity without performance loss, such as coded voice and address signals, comprising a clock source having a predetermined frequency, means for synchronizing the data to the clock source, means for modulating first and second orthogonal components synchronized with and at a submultiple of the clock frequency so that the first and second orthogonal components are each alternately altered and unaltered in response to first and second binary values of the applied data, means for bi-phase modulating orthogonal first and second orthogonal components modulated by the data, respectively, and means for combining the first and second modulated carrier components to derive a suppressed carrier constant envelope quadrature phase shift key signal.

12. Apparatus for transmitting binary coded data, said data being capable of tolerating long term polarity ambiguity without performance loss, such as coded voice and address signals, comprising a clock source having a predetermined frequency, means for synchronizing the data to the clock source, means for phase modulating a suppressed carrier offset quadrature phase shift key signal having a constant amplitude envelope at the rate of the clock frequency so the associated carrier-component phase is sequentially phase incremented 90° in the same direction $$[I+(sgnK)](90°)$$

in response to first, second, third . . . (K)th sequential bits of the binary data respectively having first or second binary values, wherein $$|K|=K,$$

$I=0, 1, 2, 3$ (initial phase condition), and $$(sgnK)=\pm 1$$

depending upon the rotation direction, each of the sequential increments being for the period of one clock cycle.

13. Apparatus for detecting data from a suppressed carrier phase shift key signal modulated so the associated carrier-component phase is sequentially incremented 90° in the same direction $$[I+(sgnK)](90°)$$

in response to first, second, third . . . (K)th sequential bits of the binary data respectively having first or second binary values, wherein $$|K|=K,$$

$I=0, 1, 2, 3$ (initial phase condition), and $$(sgnK)=\pm 1$$

depending upon the rotation direction each of the sequential increments being for the period of one clock cycle, comprising means responsive to the suppressed carrier signal for establishing a sequence of rotating reference phases at the carrier frequency, said reference phases being incremented 90° in the same direction as the suppressed carrier during the intervals while the first, second, third . . . (K)th bits are modulating the suppressed carrier, and means for phase comparing the rotating reference phase with the phase of the suppressed carrier signal to derive sequential first, second, third . . . (K)th d.c. levels indicative of the binary bit values during the first, second, third . . . (K)th binary bits.

14. Apparatus for detecting data from a suppressed carrier quadrature phase shift key signal modulated so the associated carrier component is sequentially phase shifted 90° in the same direction and in addition is selectively phase shifted 0° or 180° in response to sequential first, second, third, fourth and fifth binary bits having first or second values, comprising means responsive to the suppressed carrier signal for establishing a reference phase at the carrier frequency, said reference phase being incremented by 90° steps in the same direction as the suppressed carrier during the intervals while the first, second, third, fourth and fifth bits are modulating the suppressed carrier, and means for phase comparing the rotating reference phase with the phase of the suppressed carrier signal to derive sequential first, second, third, fourth and fifth d. c. levels indicative of the binary bit values during the first, second, third, fourth and fifth binary bits.

15. The apparatus of claim 14 wherein the means for phase comparing includes first and second orthogonal channels both responsive to the suppressed carrier and respectively responsive to first and second mutually orthogonal replicas of the reference phase, whereby first and second d.c. levels are sequentially and respectively derived in the first channel during "odd" alternate bits, and sequentially and respectively derived in the second channel during "even" alternate bits and means for combining the d.c. levels alternately derived in the first and second channels to decode the total sequential binary data stream.

16. The apparatus of claim 14 further including a phase locked tracking loop for establishing the reference phase, the tracking loop including a voltage controlled oscillator responsive to the proper combination of the d.c. levels of the first and second channels.

17. Apparatus for communicating single-channel binary coded data bits, said data being capable of tolerating long term polarity ambiguity without performance loss, such as coded voice and address signals, comprising a clock source having a predetermined frequency, means for synchronizing the data to the clock source, means for phase modulating a suppressed carrier constant amplitude envelope at the rate of the clock frequency so that the carrier phase for sequential data bits is sequentially phase incremented 90° in the same direction $$[I+(sgnK)](90°)$$

in response to first, second, third . . . (K)th sequential bits of the binary data respectively having first or second binary values, wherein $$|K|=K,$$

$I=0, 1, 2, 3$ (initial phase condition)

and $$(\text{sgn}K) = \pm 1$$

depending upon rotation direction, each of the sequential increments being for the period of one clock cycle; at a receiver, means responsive to the suppressed carrier signal for establishing a sequence of rotating reference phases at the carrier frequency, said reference phases stepping 90° in the same direction as the suppressed carrier $$[P+(\text{sgnK})](90°)$$

where P is any one of 0, 1, 2 or 3 depending on the initial phase condition of the receiver during the intervals while the first, second, third. . . Kth bits are modulating the suppressed carrier, and means for phase comparing the rotating reference phase with the phase of the suppressed carrier to derive sequential first, second, third, . . . Kth d.c. levels indicative of the binary bit values during the first, second, third . . . Kth binary bits.

18. A method of communicating a singlechannel input serial data stream synchronized to a clock source having a predetermined frequency, said data being capable of tolerating long term polarity ambiguity without performance loss, such as coded voice and address signals, comprising separating the serial data stream into two time interleaved serial components each responding proportionally to alternate data sample values alternately in a direct polarity sense and in an inverted polarity sense, amplitude modulating quadrature phase carrier components with said interleaved components, summing said modulated quadrature phase carrier components to produce a suppressed carrier having an effective sequence of quadrature phase modulated carrier components incremented in a constant direction in 90° phase steps in response to and in synchronism with data samples of the serial stream, whereby the carrier phase of each step is additionally phase shifted by 0° or 180° in response to the data samples, responding to the suppressed carrier to establish a phase for two quadrature phase coherent demodulation channels, alternately inverting and non-inverting the demodulated signals in each channel to provide an equivalent rotating phase demodulation reference stepping in synchronism with the phase of the suppressed carrier, and re-combining the time-interleaved components from the channels to provide a single-channel serial data stream substantially the same as the input data stream or its complement.

19. A method of communicating a single-channel input serial binary data stream synchronized to a clock source having a predetermined frequency, said data being capable of tolerating long term polarity ambiguity without performance loss, such as coded voice and address signals, comprising separating the serial data stream into two time interleaved serial components each responding to alternate binary data values alternately in a direct polarity sense and in an inverted polarity sense, bi-phase modulating quadrature phase carrier components with said interleaved components, summing said modulated quadrature phase carrier components to produce a suppressed carrier having an effective sequence of quadrature phase modulated carrier components incremented in a constant direction in 90° phase steps in response to and in synchronism with data bits of the stream, whereby the carrier phase of each step is additionally phase shifted by 0° or 180° in response to the data samples, responding to the suppressed carrier to establish a phase for two quadrature phase coherent demodulation channels, alternately inverting and non-inverting the demodulated signals in each channel to provide an equivalent rotating phase demodulation reference stepping in synchronism with the phase of the suppressed carrier, and recombining the time-interleaved components from the channels to provide a single-channel serial data stream substantially the same as the input data stream or its complement.

20. The method of claim 19 wherein the carrier is modulated and the quadrature components are summed so the sum has a constant amplitude envelope.

21. A method of communicating single-channel binary serial input data by suppressed carrier offset QPSK modulation with four-fold received phase reference ambiguity comprising at a transmitter alternately inverting and non-inverting responses to adjacent pairs of binary data bits in a consistent ordered fashion, then applying members of each response to respective I and Q quadrature transmission channels, at a receiver responsive to the channels alternately inverting and non-inverting binary levels of adjacent pairs of symbols in I and Q channels in the same ordered fashion as at the transmitter to provide a stream of data substantially the same as either the direct or complementary values of the input data values.

22. A method of communicating single-channel modulation serial input data by suppressed carrier offset QAM modulation with four-fold received phase reference ambiguity comprising alternately inverting and non-inverting polarity responses to adjacent pairs of data samples in a consistent ordered fashion, then applying members of each responsive to respective I and Q quadrature transmission channels, at a receiver responsive to the channels alternately inverting and non-inverting the polarity of adjacent pairs of symbols in the I and Q channels in the same ordered fashion as at the transmitter to provide a stream of data substantially the same as either the direct or complementary values of the input data values.

23. A method of transmitting binary coded serial data bits synchronized to a clock source having a predetermined frequency, said data being capable of tolerating long term polarity ambiguity without performance loss, such as coded voice and address signals, comprising the steps of dividing the data stream into first and second separate time-interleaved components synchronized with the frequency and phase of the clock source, controlling the polarity of a first modulating wave synchronized with and at the frequency of the clock source in response to the value of the first component so that alternate half cycles of the first modulating wave having first and second polarities in response to the first component respectively having first and second values, the remaining half cycles of the first wave having first and second polarities in response to the first component respectively having second and first values, controlling the polarity of a second modulating wave synchronized with and at the frequency of the clock source in response to the value of the second component, alternate half cycles of the second modulating wave having first and second polarities in response to the second component respectively having first and second values, the remaining half cycles of the second modulating wave having first and second polarities in response to the second component respectively having second and first values, said first and second modulating waves being displaced 90° relative to each other, modulating first and second mutually orthogonal components of a carrier with the first and second modulating waves to derive first and second modulated waves, and linearly combining the first and second modulated waves.

24. The method of claim 23 wherein the relative phases of the first and second modulating waves and the clock source are such that each of the modulating waves has two zero points for each pair of adjacent data bits, zero points of the first and second modulating waves always being in time coincidence with polarity changes of the first and second modulating waves, respectively.

25. The method of claim 24 wherein the first and second waves are one-half cycle of a sinusoid between adjacent zero points.

26. A method of transmitting binary coded serial data bits synchronized to a clock source having a predetermined frequency, said data being capable of tolerating long term polarity ambiguity without performance loss, such as coded voice and address signals, comprising the steps of dividing the data stream into first and second separate time-interleaved components having a symbol rate one-half that of the serial bits, controlling the polarity of a first modulating wave in response to the value of symbols in the first component so that a first set of values of adjacent symbols causes a reversal of the modulating wave polarity at a mid-point of the adjacent symbols and adjacent symbols having an opposite set of values cause the first modulating wave polarity to remain constant for the duration of the adjacent opposite valued symbols, controlling the polarity of a second modulating wave in response to the value of the symbols in the second component so that a first set of values of adjacent symbols causes a reversal of the second modulating wave polarity at a mid-point of the adjacent symbols and adjacent symbols having the opposite set of values cause the second modulating wave polarity to remain constant for the duration of the adjacent opposite valued symbols, each modulating wave having a zero point in time coincidence with a polarity change thereof, the first and second modulating waves being phase displaced 90° relative to each other, modulating first and second mutually orthogonal components of a carrier with the first and second modulating waves to derive first and second modulated waves, and linearly combining the first and second modulated waves.

27. The method of claim 26 wherein the first and second waves are one-half cycle of a sinusoid between adjacent zero points.

28. A method of transmitting binary coded serial data synchronized to a clock source having a predetermined frequency, said data being capable of tolerating long term polarity ambiguity without performance loss, such as coded voice and address signals, comprising phase modulating a suppressed carrier offset quadrature phase shift key signal having a constant amplitude envelope at the rate of the clock frequency so that the reference carrier phase for successive bits is sequentially phase rotated 90° in the same selected direction at the bit rate of the data, the reference carrier being bi-phase modulated in response to the values of the data bits so that for a pair of adjacent bits having a first set of relative values the carrier is shifted 180° in addition to the phase rotation of 90° at a mid-point between the adjacent bits and for adjacent bits having the opposite set of relative values the carrier is rotated only 90° at a mid-point between the adjacent bits.

29. The method of claim 28 wherein the first set of relative values indicates that the values differ and the opposite set of relative values indicates that the values are the same.

30. Apparatus for transmitting binary coded serial data bits synchronized to a clock source having a predetermined frequency, said data being capable of tolerating long term polarity ambiguity without performance loss, such as coded voice and address signals, comprising means for dividing the data stream into first and second separate time-interleaved components synchronized with the frequency and phase of the clock source, means for controlling the polarity of a first modulating wave synchronized with and at the frequency of the clock source in response to the value of the first component so that alternate half cycles of the first modulating wave having first and second polarities in response to the first component respectively having first and second values, the remaining half cycles of the first wave having first and second polarities in response to the first component respectively having second and first values, and for controlling the polarity of a second modulating wave synchronized with and at the frequency of the clock source in response to the value of the second component, alternate half cycles of the second modulating wave having first and second polarities in response to the second component respectively having first and second values, the remaining half cycles of the second modulating wave having first and second polarities in response to the second component respectively having second and first values, said first and second modulating waves being displaced 90° relative to each other, means for modulating first and second mutually orthogonal components of a carrier with the first and second modulating waves to derive first and second modulated waves, and means for linearly combining the first and second modulated waves.

31. The apparatus of claim 30 wherein the relative phases of the first and second modulating waves and the clock source are such that each of the modulating waves has two zero points for each pair of adjacent data bits, zero points of the first and second modulating waves always being in time coincidence with polarity changes of the first and second modulating waves, respectively.

32. The apparatus of claim 31 wherein the first and second waves are one-half cycle of a sinusoid between adjacent zero points.

33. Apparatus for transmitting binary coded serial data bits synchronized to a clock source having a predetermined frequency, said data being capable of tolerating long term polarity ambiguity without performance loss, such as coded voice and address signals, comprising means for dividing the data stream into first and second separate time-interleaved components having a symbol rate one-half that of the serial bits, means for controlling the polarity of a first modulating wave in response to the value of symbols in the first component so that a first set of values of adjacent symbols causes a reversal of the modulating wave polarity at a mid-point of the adjacent symbols and adjacent symbols having an opposite set of values cause the first modulating wave polarity to remain constant for the duration of the adjacent opposite valued symbols, and for controlling the polarity of a second modulating wave in response to the value of the symbols in the second component so that a first set of values of adjacent symbols causes a reversal of the second modulating wave polarity at a mid-point of the adjacent symbols and adjacent symbols having the opposite set of values cause the second modulating wave polarity to remain constant for the duration of the adjacent opposite valued symbols, each modulating wave having a zero point in time coincidence with a polarity change thereof, the first and second modulating waves being phase displaced 90° relative to each other, means for modulating first and second mutually orthogonal components of a carrier with the first and second modulating waves to derive first and second modulated waves, and means for linearly combining the first and second modulated waves.

34. The apparatus of claim 33 wherein the first and second waves are one-half cycle of a sinusoid between adjacent zero points.

35. Apparatus for transmitting binary coded serial data synchronized to a clock source having a predetermined frequency, said data being capable of tolerating long term polarity ambiguity without performance loss, such as coded voice and address signals, comprising a carrier source, means for phase modulating the carrier to derive an offset quadrature phase shift key signal having a constant amplitude envelope at the rate of the clock frequency so that the reference carrier phase for successive bits is sequentially phase rotated 90° in the same selected direction at the bit rate of the data, the reference carrier being bi-phase modulated in response to the values of the data bits so that for a pair of adjacent bits having a first set of relative values the carrier is shifted 180° in addition to the phase rotation of 90° at a mid-point between the adjacent bits and for adjacent bits having the opposite set of relative values the carrier is rotated only 90° at a mid-point between the adjacent bits.

36. The apparatus of claim 35 wherein the first set of relative values indicates that the values differ and the opposite set of relative values indicates that the values are the same.

37. A method of communicating binary coded serial data synchronized to a clock source having a predetermined frequency, said data being capable of tolerating long term polarity ambiguity without performance loss, such as coded voice and address signals, comprising phase modulating a suppressed carrier offset quadrature phase shift key signal having a constant amplitude envelope at the rate of the clock frequency so that the reference carrier phase for successive bits is sequentially phase rotated 90° in the same selected direction at the bit rate of the data, the reference carrier being bi-phase modulated in response to the values of the data bits so that for a pair of adjacent bits having a first set of relative values the carrier is shifted 180° in addition to the phase rotation of 90° at a mid-point between the adjacent bits and for adjacent bits having the opposite set of relative values the carrier is rotated only 90° at a mid-point between the adjacent bits, receiving the offset quadrature phase shift key signal, responding to the received signal to derive a pair of quadrature channel signals, and combining signals in the quadrature channels to derive a replica of the binary coded serial data.

38. The method of claim 37 wherein the receiving step includes coherently detecting the transmitted suppressed carrier to derive a receiver local oscillator frequency by combining the quadrature channel signals, mixing the receiver local oscillator frequency with a replica of the transmitted suppressed carrier to derive the pair of quadrature channel signals.

39. The method of claim 37 or 38 responding to the quadrature channel signals to derive a four phase bit synchronizing signal, applying first and second phases of the bit synchronizing signal to one of the channels, applying third and fourth phases of the bit synchronizing signal to the other channel.

40. The method of claim 37 or 38 responding to the quadrature channel signals to a bit synchronizing signal, each of said channels responding to its associated quadrature channel signal and the bit synchronizing signal, the second channels deriving a pair of time-interleaved signals, and combining the time-interleaved signals to derive the replica of the binary coded data.

* * * * *